3,206,290
ORGANIC AMMONIUM PHYTATES AS ADDITIVES FOR PROMOTING ELECTRICAL CONDUCTIVITY

John P. McDermott, Springfield, N.J., assignor to Esso Research and Engineering Company, a corporation of Delaware
No Drawing. Filed Jan. 16, 1961, Ser. No. 82,692
16 Claims. (Cl. 44—75)

The present invention relates to organic phytates as new compositions of matter and particularly to organic nitrogen base phytates. The instant invention concerns the utility of organic nitrogen base phytates to improve the electrical properties and characteristics of organic liquids and solid materials which have a tendency to generate, accumulate or retain electrical charges. This application is a continuation-in-part of Serial No. 783,187, filed December 25, 1958, now abandoned.

Numerous explosions have occurred in recent years during the transportation, storage, and handling of hydrocarbon fuels, dry cleaning solvents and similar combustible organic liquids boiling in the range between about 75° F. and about 750° F. There is mounting evidence that many of these explosions have been caused by the generation and accumulation of electrical charges within the liquids until vapors in admixture with air are ignited by an electrical discharge.

Study has shown that electrical charges sufficient to ignite vapor-air mixtures may be generated during the handling of a wide variety of combustible organic materials. In laboratory experiments, for example, it has been demonstrated that high voltage electrical discharges can be readily created during the pumping or other frictional movement of combustible hydrocarbon liquids boiling between about 75° F. and about 750° F., and particularly with petroleum distillate fuels. In general, the higher boiling, more viscous liquids seem to be more susceptible to the generation of electrical charges than are less viscous materials. Aviation turbo-jet fuel, gasoline, and certain solvents, carbon disulfide, for example, are particularly hazardous, however, because their volatility is such that their vapors form explosive mixtures with air over relatively wide temperature ranges. Thus, electrical discharges are likely to cause serious explosions.

Although the exact mechanisms involved in the generation, accumulation and discharge of electrical energy during the handling of combustible liquids are not fully understood, it is known that the electrical conductivity of the liquids plays an important role. Increasing the electrical conductivity of a liquid increases the rate at which charges are naturally dissipated, and therefore charges sufficient to cause an explosion are less likely to accumulate. In general, it has been found that liquids having specific conductivities in the range of about $1 \times 10^{-15}$ to about $1 \times 10^{-12}$ mhos per centimeter are particularly hazardous and that the danger in handling such liquids can be materially reduced by increasing their conductives to values greater than about $1 \times 10^{-12}$ mhos per centimeter.

It has been suggested heretobefore that various compounds be added to liquid hydrocarbons and similar combustible materials in order to increase specific conductivity and thus reduce the danger of an explosion due to the generation, accumulation and discharge of electrical energy. Certain metallic compounds, particularly soaps of polyvalent metals and combinations of such soaps with other materials, have been said to be particularly effective. In practice, however, such additives have been found to be of little practical value because they are unduly extracted by small quantities of water with which the liquids come into contact, and because they sometimes adversely affect properties other than conductivity.

Further, there has been a growing need and urgency for effective materials to aid in improving the electrical properties of nonconductive solid materials that have a tendency to generate, accumulate or retain electrical charges on their surfaces. In particular, the generation and/or accumulation of electrical charges on hydrophobic nonconductive materials such as synthetic materials, plastics, resins, rubbers, and textile fibers has been a vexing problem. The quantity and seriousness of the charges depend in part upon the nature of the material, the temperature, humidity, and the like. The hydrophobic nature of synthetic fabrics and textiles or their blends with natural animal and vegetable fibers and materials has hampered their effectiveness and full commercial use. The tendency of these synthetic textiles to generate and accumulate electrical charges renders their handling and processing hazardous by virtue of the danger of electrical discharges. Further, electrical charges accumulated on these materials have a pronounced tendency to attract dust and other deleterious material having an opposite charge.

Attempts to remedy and rectify the foregoing problem have prompted the use of radioactive metal bars to neutralize the charge by ionizing the atmosphere near the charged surface, by the use of conductive copper tinsel or other grounding means in contact with the charged surface, and the like. The subsequent employment of synthetic materials as textile fabrics has resulted in the well known "clinging" effect by virtue of the static charges on the materials. This clinging effect is particularly noticeable on the human body after certain motion has generated a charge on the fabric surface or by the attraction of other materials after a synthetic fabric has been tumbled, such as in a dryer. Attempts to solve this problem have utilized certain additives on the surface of the fabric or material to promote electrical conductivity, and thus aid in dissipating the charge before an excessive charge is allowed to accumulate. These additives have not proven to be entirely satisfactory or practcial in that some are readily susceptible to removal on laundering of the fabric or on contact with water, or alter the feel or surface of the fabric and the like.

The present invention concerns the discovery of a new composition of matter, the organic nitrogen base phytates, which have particular utility in promoting the electrical conductivity of organic liquids and in lowering the surface resistivity of solid materials. In accordance with this invention, it has been discovered that oragnic ammonium phytates are markedly effective in increasing the electrical conductivity of organic combustible liquids, especially those boiling in the range between 75° and about 750° F., while not being unduly affected by water contact or extraction. These organic ammonium phytates are particularly effective additives for use in hydrocarbon and petroleum distillate products, such as aviation turbojet fuels because they are ashless and thus do not form deposits in the combustors and nozzles of jet engines. Additionally, these organic nitrogen base phytates are surprisingly effective when employed on nonconductive solid materials such as synthetic fibers or their blends. The ammonium phytates in contact with these fibers promote the electrical conductivity of the surface of these materials, and thus aid in the reduction of excessive electrical charges and their attendant hazardous and deleterious effects. These phytates are rendered even more effective by their resistance to removal on subsequent laundering or water contact of the treated textile material. The utility of the discovered phytates is particularly striking in that, unlike many additives discovered in the past, the organic ammonium phytates are effective as an additive material for liquids and for treating nonconductive surfaces.

The new compositions of matter are organic phytates, particularly organic nitrogen base phytates, and more particularly organic ammonium phytates. These materials may be described more specifically as hydrocarbyl ammonium phytates. These phytates are formed by the reaction of an acidic phytate with a basic organic nitrogen compound to yield an organic nitrogen base phytate. The nitrogen base radical comprises a nitrogen atom having four substituent groups, at least one group being an organic radical with the ammonium nitrogen atom substituent groups being selected from the class consisting of hydrogen and organic radicals. The organic radicals are preferably directly bonded to the nitrogen atom by a carbon atom of an organic radical, and especially an organic radical having from 1 to about 30 carbon atoms.

Due to their desirable characteristics in contact with water and in promoting electrical conductivity in organic liquids and on textile fabrics, the aliphatic ammonium phytates are the preferred materials of the invention with the oil soluble tertiary ammonium phytates particularly preferred, while a mixed tertiary and quaternary ammonium phytate prepared by the neutralization of phytic acid with a tertiary amine and a quaternary ammonium hydroxide mixture being especially preferred.

The novel organic nitrogen base phytates of the invention may be prepared by reacting phytic acid or an acidic phytate salt such as calcium phytate or ammonium phytate, or an acidic partial ester or acidic metal phytate complexes, such as alkaline earth or heavy metal complexes, and the like, or preferably phytic acid with a basic organic nitrogen base compound. The preferred method of preparation is the reaction of phytic acid with a basic amine or a quaternary ammonium compound. The resulting water from the reaction or from the phytic acid concentrate may be removed by means of an azeotropic distillation employing an organic solvent such as benzene, toluene, hexane and the like. The reaction of phytic acid and a quaternary ammonium compound is an acid base type of displacement reaction. Thus, the reaction of phytic acid with quaternary ammonium hydroxide yields the desired quaternary ammonium phytate and water of the reaction. The reaction of phytic acid and an amine is an addition type of reaction with theoretically no by-product of the reaction obtained. Both reactions will yield the nitrogen base organic ammonium phytates of the invention. The organic ammonium phytates of the invention are believed to be phytates composed of a positively charged nitrogen base cation and a negatively charged phytate anion. The number of cations in the molecule may be varied from 1 to 12, depending upon the number of acidic hydrogen atoms removed from the acidic phytate anion.

The ratio of the acidic phytate to the basic organic nitrogen compound, e.g. phytic acid to quaternary ammonium hydroxide or amine, may be varied widely. Depending upon the ratio of the reactants employed, the organic phytate salt formed may have from 1 to 12 basic ammonium radicals. It has been found that the number of such groups present in the salt affects the degree to which the salt increases the conductivity of the combustible organic liquids to which it is added. In general, it has been found that the salts containing from about 1 to about 6 quaternary ammonium groups are somewhat more effective than the more fully substituteed salts. The use of the mono-substituted to hexa-substituted phytate compounds for promoting electrical conductivity is therefore preferred.

The quaternary ammonium hydroxides which are employed in preparing the quaternary ammonium phytates include those hydroxides wherein organic radicals attached to the central ammonium nitrogen atom may be substituted or unsubstituted, aliphatic, alicyclic, heterocyclic, aromatic, or arene radicals, including alkylaryl and arylalkyl, of from 1 to about 30 carbon atoms, or combinations thereof. These organic radicals may have substitutent groups such as hydroxyl, sulhydryl, halogen, ether bound oxygen, acetylenic groups, nitro, sulfur, sulfoxy, and the like. Due to economic availability, present cost, and electrical characteristics, the tetra-aliphatic quaternary ammonium hydroxides are the preferred reactants of the quaternary ammonium hydroxides. The aliphatic substituent groups may be alkyl, alkenyl, alkynyl, cycloalkene, and cycloalkene radicals of from 1 to 30 carbon atoms, or combinations thereof.

Examples of suitable quaternary ammonium phytates prepared by reacting phytic acid with quaternary ammonium hydroxide include tetramethyl ammonium phytates, tetrapropyl ammonium phytates, methyltributyl ammonium phytates, dimethyldibutenyl ammonium phytates, isopropyltrihexyl ammonium phytates, diethyl dihexadecyl ammonium phytates, dimethyldioleyl ammonium phytates, trimethyloleyl ammonium phytates, butyltrioleyl ammonium phytates, dibutyldicyclopentyl ammonium phytates, tetraheptadecyl ammonium phytates, tetraeicosyl ammonium phytates, dimethyl benzyl soya ammonium phytates, triethyltolyl ammonium phytates, trimethylcyclohexyl ammonium phytates, octadecyldimethyl benzyl ammonium phytates, 1-ethylquinolinium phytates, trimethylphenyl ammonium phytates, 1-ethylpyridinum phytates, cetyldimethyl benzyl ammonium phytates, tributyl-4-octynyl phytates, dimethylpropyl-4-nitrooctyl phytates, trimethyl-10-mercaptooctadecyl ammonium phytates, dimethyldi-(10-chlorooctadecyl) ammonium phytates, and the like.

All of the above salts may contain from 1 to 12 ammonium groups. The especially preferred quaternary ammonium phytates are those oil soluble phytates having a mixture of lower alkyl groups and aliphatic groups of from 8 to 18 carbon atoms, such as dialkyl dialiphatic $C_8$–$C_{18}$ phytates, wherein the aliphatic groups are derived from commercially available saturated and unsaturated fatty acid radicals. The basic nitrogen compounds useful in the preparation of the inventive compounds may also include nitrogen compounds having substituent groups derived from naturally occurring materials such as from vegetables, animal and marine fats and oils like beef tallow, soybean, coconut, cottonseed, olive, linseed, palm kernel, corn, peanut, cod, whale, tung, lard, and the like. These fats and oils are mixtures of saturated and unsaturated enoic dienoic and dienoic fatty acids of from about 8 to 20 carbon atoms per molecule. Quaternary ammonium compounds and amines suitable for preparing the inventive phytates and containing fatty acid substituent groups as above are available from commercial sources. An example of a suitable commerical tertiary amine is a methyl disoya amine wherein the soya radical contains approximately 20 weight percent hexadecyl, 17 weight percent octadecyl, 26 weight percent octadecenyl, 37 weight percent octadecadienyl and about 7 weight percent of other unidentified material. Suitable commercial amines include those with a mean molecular weight of from 260 to about 530. Tertiary aliphatic amines having one lower alkyl group of from 1 to 6 carbon atoms and at least one long chain aliphatic group of from 8 to 18 carbon atoms, e.g. derived from fatty acids, yield particularly effective oil soluble aliphatic tertiary ammonium phytates. Commercial amines would thus include methyl dioleyl amines, methyl dihydrogenated tallow amines, dimethyl soya amine, ethyl disoya amine, methyloleyl amine, ethyl soya amine, dimethyl coco amine, and the like.

A suitable commercial quaternary ammonium hydroxide whose substituent groups are derived from naturally occurring materials would be trimethyl soya ammonium hydroxide, dimethyl dicoco ammonium hydroxide, dimethyl ditallow ammonium hydroxide and the like. Quaternary ammonium compounds and amines having one and preferably two or more of such naturally occurring fatty acid groups are generally less expensive and readily available and therefore commercially preferred for preparing oil soluble phytates.

The basic organic nitrogen radical of the ammonium phytates may also be derived from the reaction of an acid phytate, such as phytic acid, or a partially neutralized phytate, with a substituted or unsubstituted primary, secondary, or tertiary organic amine; diamines; polyamines; hydroxyl amines; carboxylic amines; amidines; and the like. The amines may have substituted or unsubstituted, aliphatic, alicyclic, aromatic, heterocyclic, or arene organic radicals of from 1 to 30 carbon atoms or combinations thereof. Aliphatic amines, such as unsubstituted aliphatic amines having alkyl, alkenyl, and alkynyl radicals and mixtures thereof, and especially oil soluble tertiary aliphatic amines, are preferred materials.

Suitable amines include primary amines such as: p,p'-dibutyldiphenyl amine, 4-amyl-α-naphthyl amine, ethyl amine, sec. butyl amine, allyl amine, 2-amino ethanol, 2-phenyl ethyl amine, α-methyl benzyl amine, 2-amino-2-methyl-1-propanol, para-amino benzoic acid, toluidine, chloroaniline, urea, thiourea, octylamine, oleylamine, cyclohexylamine, benzylamine, p-methoxybenzylamine, p-anisidine, aniline, 1-naphthylamine, p-aminophenol, octyl-p-aminobenzoate, p-octyaniline, and the like; secondary amines such as: di-isoamylamine, di-oleylamine, di-soya amine, di-cyclohexylamine, N-methylcyclohexylamine, diphenylamine, N-octyl-1-naphthylamine, N,N'-bis-(t-octyl)-thiourea, N-phenyl-N'-t-octylurea, N-octylcyclohexylamine, N-(2-ethylhexyl)aniline, quinoline morpholine and alkyl morpholine, such as N-methyl and N-ethyl morpholine, phenothiazine, dimethylpiperidine, piperidine, pyrrolidine, dihydrogenated tallow amine, pyrazole, pyrazoline, p-methylaminophenol, and the like; tertiary amines such as: tributyl amine, methyldisoya amine, methyldioleylamine, dimethyloleylamine, 2-diethylamino ethanol, tribenzyl-amine, N,N-diethylcyclohexylamine, N,N-dibutylaniline, di(2-ethylhexyl)ethanolamine, N-dodecylmorpholine, pyridine, B-picoline, pyrazine, trioleylamine, N-octyl cyclohexyl amine, N-methyl-2-pyrrolidone, polyvinyl pyrrolidone, and the like; alkaloids such as: nicotine, morphine, quinine, papaverine, ephedrine, tropine, atropine, coniine, cocaine, brucine, and the like; polyamines, including di-amines and diamino dialkyl amines such as: hexamethylenetetramine, ethylene diamine, 1,6-hexanediamine, p-phenylenediamine, N-oleylpropane diamine-1,3, piperazine, N,N'-dibutyl-p-phenylenediamine, tetramethylethylene diamine, dimethylaminomethyl phenols, triamines like aminoethyl piperazine, combining a primary, secondary, and tertiary amine group in a single molecule, and the like; carboxylic amines or amino acids such as: aminoacetic acid, p-aminophenylacetic acid, 4-aminobutyric acid, 2-amino hexanoic acid, and the like; azo amines such as: p-dimethylaminoazobenzene-o-carboxylic acid, azobenzene, p-phenylazoaniline, and the like; guanidines and amidines such as: p-butylphenyl guanidine, phenyl biguanidine, benzoguanamine, triphenyl guanidine, 1,3-diotolyl guanidine, tetramethyl guanidine, formamidine, N,N-diphenyl formamidine, and the like; hydrazines such as: alkyl hydrazine, aryl hydrazine and quaternary hydrazinium bases, hydrazine, phenylhydrazine, N,N-dimethyl-N-octadecylhydrazinium hydroxide, dimethyl hydrazine, and the like; hydroxyl amines or amino alcohols such as: alkanol amines, triethanol amines, 3-diethyl amino-1-propanol, 2-amino ethanol, 1-amino-2-propanol, 2-2'-imino diethanol, 2-amino-2-methyl-1,3-propane diol, 2-anilino-ethanol, t-butyl amino ethanol, the alkyl alkanol amines like methyl ethanolamine, ethyl ethanolamine ethyl diethanolamine, and the like; polyalkoxyl amines such as tri-polyethoxy amine and the like.

The importance and wide scope of this invention may be appreciated by the formation of the ammonium phytates with those amines already commercially utilized or suggested for use in combustible liquids like jet fuels and gasoline for other purposes. Thus, multifunctional ammonium phytates may then be formed having the amine function coupled with the promotion of electrical conductivity. In this category, suitable amines that may be employed to provide multifunctional effects when used as the ammonium phytic acid in, for example, gasoline are antioxidants such as the para phenylene diamines, like N,N'-di-sec-butyl-p-phenylene diamine and the amino phenols like N-butyl-p-amino phenol; metal deactivators such as the salicylidines like N,N'-disalicylal-1,2-diamino alkenes, N,N'-disalicylal ethylene diamine; antiknock agents such as the xylidines; anti-icing agents such as amino alcohols, like 2-amino-2-methyl-1-propanol; rust preventives, such as propylene diamines; surfactants such as the imidazolines; combustion chamber deposit modifiers such as the amine phosphates and nitrates; and so forth.

Phytic acid, the preferred reactant material to form the organic phytates of this invention is the hexaphosphoric acid ester of inositol. This compound has the formula:

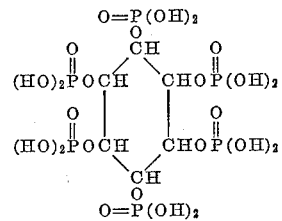

*Phytic acid*

The ammonium phytates prepared as described are added to combustible organic materials and especially liquids boiling in the range of between about 75° F. and about 750° F. in accordance with the invention in concentrations ranging between about 0.00001% to about 1% by weight. Concentrations between about 0.0001 to about 0.05% by weight are effective for most purposes and will generally be preferred. It will be recognized, however, that the concentration employed will depend somewhat upon the particular ammonium phytate utilized, since the effectiveness of the salts varies with variations in the number of ammonium substitutents present. Those organic ammonium phytates wherein the organic nitrogen base is a mixture of an aliphatic quaternary ammonium hydroxide and a tertiary aliphatic amine and particularly those having a quaternary to amine ratio of between 4:1 and 1:4, and preferably 3:1 to 1:1, are especially suited as additive materials which are not unduly affected by water contact or extraction. For example, phytic acid may be neutralized with a mixture of a dimethyldioleyl ammonium hydroxide and a methyl disoya amine to yield an effective mixture of ammonium phytates.

The organic liquids in which the additives of the invention may be employed advantageously are those combustible organic liquids boiling in the range between about 75° F. and about 750° F.

The invention is of particular importance for very volatile organic liquids containing not more than 12 carbon atoms per molecule, since with these liquids the danger of ignition or explosion occurring as a result of electrical charges is articularly great. Examples of organic liquids to which this invention is applicable are aliphatic hydrocarbons or mixtures thereof, such as hexane, heptane, petroleum naphtha, and gasoline; aromatic hydrocarbons or mixtures thereof, such as benzene, toluene and the xylenes; cyclo-aliphatic hydrocarbons, such as decalin; mixtures of various aliphatic, cyclo-aliphatic and aromatic hydrocarbons; halogenated hydrocarbons or mixtures thereof, such as chloroform, carbon tetrachloride, trichloroethylene, bromobenzene, and tetra-chloroethylene and ethers, such as diethyl ether and dioxane; and other liquids such as carbon disulfide, synthetic ester lubricating oils, natural oils derived from animal, vegetable or mineral sources.

The phytate additives are particularly useful in gasoline, aviation turbo-jet fuel, kerosene, diesel fuel, lubricating oils, greases, cutting oils, and similar petroleum distillate fuels and products. Gasolines which may be benefited by the presence of the additive include both motor gasolines and aviation gasolines such as those defined by ASTM Specifications D–910–57T and D–439–58T. Aviation turbo-jet fuels in which the additives of the invention are particularly useful are described at length in U.S. Military Specifications MIL–F–25524A, MIL–F–5624D, MIL–F–25558B, and MIL–F–25656(1), and in ASTM specifications for Aviation Turbine Fuels D–1655–59T. Diesel fuels and fuel oils as referred to in connection with the invention are defined in ASTM Specifications D–975–59T and D–396–48T.

If desired, the additive agents of the invention may be incorporated into petroleum distillate fuels in the form of an additive concentrate containing the organic ammonium phytate in combination with other additives conventionally used in such fuels. Such conventional additives include rust inhibitors, dyes, dye stabilizers, antioxidants, and the like. An organic solvent such as benzene, xylene, toluene, diethylene, glycol pyridine, turbo-jet fuel, or the like may be used as the vehicle in such a concentrate.

The organic nitrogen base phytates of the invention may also be profitably and surprisingly employed in treating nonconductive solid material such as paper, rubber, plastics, resins, asbestos, wood, and synthetic fibers and textiles, and blends thereof in order to promote the electrical conductivity of the surface. The textile fibers or other materials may be treated with the inventive phytates by brush, spray, dip, coating, impregnation, or other convenient means or techniques of application for treating the surface of the material to be protected with the desired phytate. The treated material may be synthetic plastics and resins in fiber, fabric, film, tube, or other form. Suitable synthetic textile fibers which would be benefited by treatment with the phytates of the invention include acrylics, polyesters, polyamides, polyethene, polypropylene, polyvinyl chloride, glass fibers, and the like, and blends thereof with other materials such as wool, cotton, felt, asbestos, and other ingredients. The phytate treatment may be beneficially accomplished in the presence or absence of other finishing and testing materials, such as starch, wrinkle-proofing ingredients, resin finishes, and the like.

The organic ammonium phytates may be successfully employed by treating the desired material so as to deposit a minor amount of the phytate on the surface to be protected. Preferred methods of application include dipping or impregnating the item to be treated in a solution of a volatile liquid solvent such as an aliphatic or aromatic alcohol like benzyl alcohol, isopropanol, ethanol; an ether like anisole, ethyl ether; a hydrocarbon like toluene, heptane; a halogenated solvent like chloroform, perchloroethylene and the like; or combinations thereof which may contain from 0.1 to 10.0 weight percent of the desired additive and usually from 0.5 to 2.0 weight percent. In certain cases, direct contact by wiping the phytate directly or in admixture with paraffin or other filler materials directly on the surface is recommended.

The exact nature and objects of the invention may be more fully understood from the following examples.

EXAMPLE 1

Quarternary ammonium salts of phytic acid were prepared by reacting dimethyldioleyl ammonium hydroxide with phytic acid in varying amounts.

The quaternary ammonium hydroxide was added to a mixture of phytic acid in benzene, with stirring, in a flask equipped with a condenser and water trap. After addition was complete, the reaction mixture was distilled until all the water was removed. The products, obtained on evaporation of the benzene, were cream-colored, waxy solids. Analysis showed the salts prepared to be mono-dimethyldioleyl ammonium phytate, tri-dimethyldioleyl ammonium phytate, hexa-dimethyldioleyl ammonium phytate and docecyl-dimethyldioleyl ammonium phytate. Other quaternary ammonium phytates of the examples were prepared in a similar manner and also mono-tetradecyl ammonium phytate.

EXAMPLE 2

Other organic ammonium phytates were prepared by reacting a tertiary aliphatic amine such as methyl disoya amine with phytic acid in varying amounts.

The mono-methyl disoya ammonium phytate was prepared by adding ten grams (about 0.014 mole active ingredient) of a methyl disoya amine commercial mixture to a stirred dispersion of 13.2 grams (0.014 mole) of phytic acid (70% solution in water in benzene-zylene, followed by azeotropic distillation to remove the water. Subsequent filtration of the slightly hazy reaction mixture yielded a clear concentrate of the mono-methyldisoya ammonium phytate in xylene in approximately theoretical yield amounts. The mono-methyldisoya amine phytate will be hereafter identified as mono M2SA phytate. Other amine salts, as in the examples, were prepared in a similar manner; and also prepared in this manner were mono-soya ammonium phytate, hexa-soya ammonium phytate, diethanol soya ammonium phytate, and di-dimethyl soya ammonium phytate.

EXAMPLE 3

In order to demonstrate the effectiveness of the organic ammonium phytates to promote electrical conductivity, tests were carried out to determine the specific conductivity of samples of aviation turbo-jet fuel and samples of the same fuel to which had been added the phytic acid salts. The turbo-jet fuels employed in these tests were representative of the fuels classified as JP–4 jet fuels. These fuels had an API gravity of about 48.7°, a Reid vapor pressure of about 2.5 pounds per square inch and a boiling range of from about 100° to about 520° F. The salts employed were the mono-, tri-, hexa- and dodecyl-dimethyldioleyl ammonium salts of phytic acid and the mono-dimethyldisoya ammonium salt of phytic acid.

The tests were carried out by applying a fixed, direct-current voltage across a standard conductivity cell containing the sample to be tested. A standard high-resistance element was connected in series with the cell and the current which flowed in the circuit during the test was computed by measuring the voltage across the resistance element and applying Ohm's law. The resistance of the sample, the specific resistance and the specific conductivity were in turn computed. The results of these tests are shown below for the base fuel and for the samples of the base fuel containing the various salts.

Table I
EFFECT OF ADDITIVES UPON ELECTRICAL CONDUCTIVITY IN JP-4 AT 0.01 WEIGHT PERCENT

| Composition | Specific conductivity $\sigma$, mho/cm. $\times 10^{-12}$ | Ratio $\sigma$ (base+additive) to $\sigma$ base |
|---|---|---|
| Base JP-4 | 0.04 | |
| Mono-dimethyldioleyl ammonium phytate | 13.0 | 325 |
| Tri-dimethyldioleyl ammonium phytate | 15.0 | 375 |
| Hexa-dimethyldioleyl ammonium phytate | 6.6 | 165 |
| Dodecyl-dimethyldioleyl ammonium phytate | 4.2 | 105 |
| Mono-dimethyldisoya ammonium phytate | 3.2 | 80 |
| Mono-methyldisoya ammonium phytate | 45.0 | 1,125 |
| Tri-oleyl ammonium phytate | 16.0 | 400 |
| Di-(n-cocomorpholine) ammonium phytate | 0.4 | 10 |
| Mono-disoya ammonium phytate | 58.0 | 1,450 |
| Nona-diethanolsoya ammonium phytate | 0.9 | 23 |

The data in Table I above demonstrate that the organic ammonium phytates produced a marked increase in the specific conductivity of combustible organic liquids. It will be noted that the increase in conductivity was particularly great in mono- and tri-quaternary ammonium phytates of dimethyl dioleyl ammonium phytates and the mono- and tri-tertiary and secondary ammonium phytates containing organic radicals derived from fatty acid groups or alkyl and fatty acid groups. The above data illustrate that conductivity increases may be obtained with a variety of organic ammonium phytates. By virtue of their increased conductivity, combustible organic liquids containing these additives are much less likely to accumulate electrical charges than are similar liquids not containing the additives. The danger of an explosion while handling such liquids is thus reduced as a result of the presence of the additives.

EXAMPLE 4

Further tests were performed utilizing organic ammonium phytates as additives at lower concentration levels and employing ammonium phytates derived from mixtures of quaternary ammonium hydroxides and amines. The results obtained are shown in Table II.

Table II
EFFECT OF ADDITIVES UPON ELECTRICAL CONDUCTIVITY IN JP-4 AT 0.005 WT. PERCENT

| Composition | Conductivity $\sigma$, mho/cm. $10^{-12}$ | Ratio $\sigma$ (base+additive) to $\sigma$ base |
|---|---|---|
| Base fuel (no additive) | .05 | |
| Mono-methyldisoya ammonium phytate[a] | 19 | 380 |
| Mono-methyldi-(hydrogenated tallow) ammonium phytate[a] | 22 | 440 |
| Mono-(methyldisoya ammonium)-mono-(dimethyldioleylammonium) phytate[b] | 15 | 300 |
| Mono-methyldioleyl ammonium phytate[a] | 17 | 340 |
| Di-methyldioleyl ammonium phytate[a] | 6.8 | 136 |
| Mono-(methyldioleylammonium)-mono-(dimethyldioleylammonium) phytate[b] | 12 | 240 |
| (Methyldioleylammonium)$_{0.5}$(dimethyldioleylammonium)$_{1.5}$ phytate[b] | 11.3 | 226 |
| Mono-(oleylammonium)-di-(dimethyldioleylammonium) phytate[c] | 9.2 | 184 |
| Mono-(disoya ammonium) (di-dimethyldioleyl) ammonium phytate[d] | 5.3 | 106 |
| Mono-(methyldisoya ammonium)-di-(dimethyldioleylammonium) phytate[b] | 8 | 160 |
| Bis-1,6-hexanediammonium di-(dimethyldioleylammonium phytate)[e] | 7.2 | 144 |

[a] tertiary amine
[b] mixed tertiary-quaternary phytate
[c] mixed primary-quaternary phytate
[d] mixed secondary-quaternary phytate
[e] mixed primary diamine-quaternary phytate NOTE.—Where no subscripts were employed, the phytates of the mixed base compounds were obtained by equimolar mixtures of the amine and the quaternary ammonium hydroxide.

The data of Table II illustrates that mixtures of suitable organic nitrogen base compounds, such as aliphatic quaternary ammonium hydroxides and aliphatic amines, yield mixed organic ammonium phytates as additives that promote electrical conductivity when employed at extremely low concentration levels.

EXAMPLE 5

To further demonstrate the effectiveness of the additives of the invention and to point out the effect of variations in the additive concentration, further tests were carried out wherein the specific conductivities of an aviation turbo-jet fuel similar to that employed in the preceding test and samples of the same fuel containing from 0.001 to 0.05% by weight of the mono-dimethyldioleyl ammonium salt of phytic acid and 0.0001 to 0.5% by weight of the mono-methyldisoya ammonium phytate were determined. The results of these determinations are summarized in Table III.

Table III
EFFECT OF ADDITIVE CONCENTRATION UPON ELECTRICAL CONDUCTIVITY OF JP-4

| Additive concentration, Weight percent | Specific conductivity $\sigma$, mho/cm. $\times 10^{-12}$ | |
|---|---|---|
| | DMDO [1] | M2S [2] |
| None | 0.04 | 0.04 |
| 0.0001 | | 0.97 |
| 0.0005 | | 2.6 |
| 0.001 | 1.2 | 7.0 |
| 0.005 | 2.5 | 32.0 |
| 0.01 | 13.0 | 58.0 |
| 0.05 | 35.0 | 280.0 |

[1] Mono-dimethyldioleyl ammonium phytate.
[2] Mono-methyldisoya ammonium phytate.

From Table III it can be seen that the use of from 0.001 wt.% to 0.5 wt% of the mono-dimethyldioleyl ammonium salt of phytic acid resulted in an increase in the specific conductivity of the turbo-jet fuel of from 30 fold to 875 fold. This increase varies in direct proportion to the amount of the additive employed.

The mono-tertiary ammonium phytate, i.e. mono-methyl disoya ammonium phytate, resulted in surprising increases in electrical conductivity even at extremely low concentration levels. This increase, unlike that of the quaternary ammonium phytates did not vary in direct proportion, but increased with concentration in an unexpected manner. The use of 0.0001 weight percent to 0.05 weight percent of mono-methyl disoya ammonium phytate resulted in an increase in the specific conductivity of the turbo-jet fuel of from 24 to 7000 fold. Since combustible liquids having specific conductivities greater than about $1.0 \times 10^{-12}$ mhos per centimeter present much less of a hazard than those having lower conductivities, the use of from about 0.0001 weight percent to about 0.05 weight percent of the additives will normally be sufficient. Since the effectiveness of the additive depends to some extent on the particular compound employed, however, in some cases it may be desirable to use concentrations outside this range.

EXAMPLE 6

Small amounts of water frequently accumulate in aviation turbo-jet fuels, kerosines and similar combustible liquids during storage. The effect of additives employed in such liquids upon their water tolerance properties is, therefore, of primary importance. It has been found that many of the additives suggested as useful for increasing the conductivity of combustible organic liquids in the past are highly surface-active materials which have an extremely adverse effect upon water tolerance. The increased conductivity brought about through the use of such additives may largely be offset as a result of this tendency to promote the suspension of dispersed water.

In order to determine the effect of the quaternary ammonium salts of phytic acid on the water tolerance of combustible organic liquids to which they are added, water tolerance tests were carried out in accordance with the method described in Federal Test Standard No. 791, Method 325.6, "Interaction of Water and Aircraft Fuel." In brief, this test comprises agitating 80 cc. of the fuel to be tested with 20 cc. of water for a 2-minute period and then allowing the water to settle for 5 minutes. At the end of the settling period, the condition of the water-fuel interface is noted. The interface rating is assigned as follows:

INTERACTION OF WATER AND AIRCRAFT FUELS
[Method 3251.6, Fed. Test Std. No. 791]

Appearance of interface: Interface rating
  Clear and clean _____ 1
  A few small clear bubbles covering not more
    than 50% of the interface _____ 1B
  Shred of lace and/or film at interface _____ 2
  Loose lace and/or slight scum _____ 3
  Tight lace and/or heavy scum _____ 4

The condition of the fuel layer and the water layer on either side of the interface is also noted. An interface rating of 1 or 1B, with no sign of haze or emulsion in the fuel or water layer, is a passing rating and meets the requirements of the Military Specifications governing the water tolerance of aviation turbo-jet fuels. The results obtained in tests of the additives of the invention and additives representative of the prior art are shown in Table IV.

*Table IV*

WATER TOLERANCE OF ADDITIVES

Composition: Water tolerance interface rating
  Base JP-4 _____ 1
  Base JP-4+0.01 wt. percent of mono-dimethyldi
    oleyl ammonium salt of phytic acid _____ 1
  Base JP-4+0.01 wt. percent of tri-dimethyldioleyl
    ammonium salt of phytic acid _____ 1B
  Base JP-4+0.01 wt. percent of hexa-dimethyldi-
    oleyl ammonium salt of phytic acid _____ 1B
  Base JP-4+0.01 wt. percent of calcium petroleum
    sulfonate _____ 4
  Base JP-4+0.05 wt. percent of sodium dioctyl sul-
    phosuccinate _____ 4
  Base JP-4+0.01 wt. percent of lecithin _____ 4

It will be noted that the addition of the phytic acid salts of the invention to the turbo-jet fuel does not reduce the interface rating below the acceptable level of 1B. The additives thus meet the critical water tolerance requirements for tubo-jet aviation fuels. The prior art materials, on the other hand, gave ratings which clearly disqualify them for such use. This superiority of the phytic acid salts is surprising in view of results obtained with other materials and is wholly unpredictable.

EXAMPLE 7

A further critical requirement imposed upon additives employed in turbo-jet aviation fuels, gasolines, kerosines and similar materials is that they not be extracted from the material upon contact with small amounts of water normally present in storage tanks, pipe lines and the like. Tests were carried out to determine the effect of water extraction on the additives of the invention and additives suggested in the prior art by measuring the specific conductivity of samples of a turbo-jet fuel containing the additives both before and after water extraction. A reduction in specific conductivity following water extraction would indicate that substantial amounts of the additive were extracted by the water. The extraction test involved the agitation of 80 cc. of the fuel and 20 cc. of water for 2 minutes, after which the samples were allowed to stand overnight. The fuel which separated from the water was decanted and tested for specific conductivity as described in Example 2. Results of these tests are shown in Table V.

*Table V*

WATER EXTRACTABILITY OF ADDITIVES

| | Water washed | Specific conductivity $\sigma$, mho/cm. |
|---|---|---|
| Base JP-4 | No | $4.0 \times 10^{-14}$ |
| Do | Yes | $6.0 \times 10^{-14}$ |
| Base JP-4+0.01 wt. percent of mono-dimethyldioleyl ammonium salt of phytic acid | No | $1.3 \times 10^{-11}$ |
| Do | Yes | $3.2 \times 10^{-11}$ |
| Base JP-4+0.01 wt. percent of calcium petroleum sulfonate | No | $2.0 \times 10^{-12}$ |
| Do | Yes | $2.1 \times 10^{-13}$ |
| Base JP-4+0.05 wt. percent of sodium dioctyl sulpho-succinate | No | $2.5 \times 10^{-12}$ |
| Do | Yes | $6.0 \times 10^{-13}$ |
| Base JP-4+0.01 wt. percent of Lecithin | No | $3.0 \times 10^{-12}$ |
| Do | Yes | $1.0 \times 10^{-13}$ |

Although metallic salts such as calcium sulfonate and similar materials which have been suggested for use as additives to improve the electrical properties of combustible orgainc liquids in the past are readily extracted by water in the above-described test, it can be seen from the data in Table V that the specific conductivity of the fuel containing the mono-dimethyl dioleyl ammonium salt of phytic acid was actually higher following the water extraction step than it was before extraction. The additives of the invention thus obviously are not extracted from turbo-jet fuels and similar combustile liquids upon contact with water and there is, therefore, little danger of losses of the additive during storage and transportation. This constitutes an important advantage for the additive of the invention over prior art materials.

EXAMPLE 8

A comparison of the effectiveness of various tertiary ammonium phytates wherein the number of substituent groups is varied is shown in the data of Table VI.

*Table VI*

EFFECT ON ELECTRICAL CONDUCTIVITY BY VARYING THE SUBSTITUENT GROUPS OF TERTIARY AMMONIUM PHYTATES
[0.01 weight percent in JP-4]

Methyl disoya ammonium    Specific conductivity
    phytate ([1])              $\sigma$ mho/cm. $\times 10^{-12}$
  Mono _____ 64.0
  Di _____ 41.0
  Tri _____ 24.0
  Hexa _____ 8.5
  Nona _____ 8.5
  Dodeca _____ 7.3
  Base fuel (alone) _____ 0.06

[1] Obtained by using increasing mole ratio of amine to phytic acid.

EXAMPLE 9

The ammonium phytates of the invention have been discovered to be extremely and surprisingly effective both in organic liquids and in promoting the electrical conductivity on the surfaces of solid materials such as nonconductive synthetic textiles, plastics, and the like. When employed in treating the surface of a nonconductive material, such as a textile fabric, the ammonium phytates do not alter the appearance or feel of the treated surface and further are resistant to removal by laundering with aqueous detergents and soap, water contact, and dry cleaning solvents. The ammonium phytates may be applied by dipping the item to be tested into a solution of the phytate in a volatile solvent followed by evaporation of the solvent, or may be applied by wiping the pure additive material directly on the surface to be tested, or by spraying from an aerosol can, or other convenient methods of application.

To demonstrate the efficacy of the ammonium phytates in preventing static generation arising from the frictional contact of solid surfaces, such as textiles, plastics, rubber, and the like, a test was performed utilizing the Keithley Electrometer. This instrument (Model 200) was equipped with a Keithley Static Detector (Model 2005). The test materials used were twelve-inch square pieces of nylon jersey cloth.

A piece of cloth was stroked several times with a Lucite rod. When the cloth was placed near the static detector, the meter needle jumped beyond the 10 volt meter scale in the negative direction; when the Lucite rod was placed near the static detector, the needle jumped off-scale in the opposite direction.

The cloth was then dipped in a 1.0% solution of di-dimethyldioleyl ammonium phytate in chloroform. After evaporation of solvent the above test was repeated. This treated cloth showed no activity—the meter needle remained at zero. The Lucite rod, however, was still active.

A small amount of the pure dimethyldioleylammonium phytate (solvent-free) was rubbed on the Lucite rod after which it was wiped with a clean cloth. The treated rod showed no static activity after contact with untreated cloth.

To determine the permanency of this additive treatment, one piece of treated cloth was washed in hot Alconox solution, rinsed, and dried; another piece of treated cloth was dipped in perchloroethylene and dried, six times. Neither cloth showed any static activity, indicating that the additive was still retained on both pieces of cloth.

A piece of cloth was dipped in a 1.0% solution of tri-(methyldisoya ammonium) phytate in isopropanol and then dried. The cloth showed no static activity in the tests described above. A Lucite rod, dipped in this solution and dried, also showed no static activity.

The foregoing test results demonstrate the remarkable properties of the synthetic textile materials treated with organic ammonium phytates.

In summary, the applicant has discovered a new class of materials, the ammonium phytates, which have particular utility in promoting electrical conductivity in both organic liquids, preferably petroleum distillate fuels, and in treating nonconductive solid materials, in particular textile fibers and fabrics. Additionally, the discovered ammonium phytates are not readily affected by water contact. The preferred ammonium phytates are those oil soluble aliphatic ammonium phytates with the tertiary ammonium phytates especially preferred, while mixed quaternary-tertiary ammonium phytates are particularly preferred additives. The ammonium phytates of this invention and/or phytic acid may be employed in conjunction with certain alkyl acid phosphates, lecithin, condensation products of lecithin and ammonium phytates, with polyvalent metal complexes including chromic acetate complexes of phenols, phenol sulfides, mercaptans, alcohols, and the like, with alkylene oxides, and other materials, and especially with other additives designed to improve the electrical properties of combustible material heretofore. It will be understood that modification within the skill of those adept in the art may be made without departing from the scope of the invention.

What is claimed is:

1. An organic liquid having a tendency to accumulate electrical charges and to which has been added a minor amount sufficient to promote the electrical conductivity of said organic liquid of an organic ammonium phytate having from 1 to 4 organic radicals bonded to the ammonium nitrogen atom by a carbon-to-nitrogen bond; each of said organic radicals containing from 1 to 30 carbon atoms.

2. A composition as claimed in claim 1 wherein the organic radical is an aliphatic radical of from 1 to 30 carbon atoms.

3. An organic liquid boiling in the range between about 75° F. and about 750° F. to which has been added from 0.0001 to about 1.0% by weight of an organic ammonium phytate having from 1 to 2 lower alkyl groups and two aliphatic groups of from 8 to 20 carbon atoms bonded to the ammonium nitrogen atom.

4. A petroleum distillate fuel boiling in the range between 75° F. and 750° F. to which has been added from 0.0001 to 0.05% by weight of methyldisoya tertiary ammonium phytate.

5. A combustible organic liquid boiling in the range between about 75° F. and about 750° F. to which has been added from about 0.0001% to about 1% by weight of tetra-aliphatic quaternary ammonium salt of phytic acid in which the aliphatic groups each contain from 1 to 24 carbon atoms.

6. A composition as defined by claim 5 wherein said salt is present in a concentration in the range between about 0.001% and about 0.05% by weight.

7. A composition as defined by claim 5 wherein said salt is a dimethyl dialiphatic ammonium salt wherein the aliphatic groups each contain from about 16 to about 20 carbon atoms.

8. A composition as defined by claim 5 wherein said salt contains from 1 to about 6 quaternary ammonium substituents.

9. A composition as defined by claim 5 wherein said liquid is a hydrocarbon oil.

10. A composition as defined by claim 5 wherein said salt is a mono-dimethyldioleyl ammonium salt of phytic acid.

11. A petroleum distillate fuel boiling in the range between about 75° F. and about 750° F. having incorporated therein from about 0.001% to about 0.05% by weight of an unsubstituted tetraaliphatic ammonium salt of phytic acid in which the aliphatic groups each contain from 1 to 24 carbon atoms.

12. A fuel as defined by claim 11 wherein said salt is a mono-dimethyldioleyl ammonium salt.

13. A fuel as defined by claim 11 wherein said salt is a tri-dimethyldioleyl ammonium salt.

14. A liquid hydrocarbon boiling in the range between about 75° F. and about 750° F. containing from about 0.001% to about 0.05% by weight of a tri-dimethyldioleyl ammonium salt of phytic acid.

15. An organic liquid boiling in the range between about 75° F. and about 750° F., said liquid having incorporated therein a minor amount sufficient to promote the electrical conductivity of said organic liquid of an organic ammonium phytate containing aliphatic quaternary ammonium substituents of from 1 to 30 carbon atoms and aliphatic amine substituents of from 1 to 30 carbon atoms.

16. An organic liquid according to claim 15 wherein the ratio of quaternary ammonium substituents to amine substituents is between 4:1 and 1:4.

References Cited by the Examiner

UNITED STATES PATENTS

| | | | |
|---|---|---|---|
| 1,645,233 | 10/27 | Gams et al. | 260—461 |
| 2,268,556 | 1/42 | Adams et al. | 260—461 |
| 2,279,502 | 4/42 | Dickey et al. | 252—8.8 |
| 2,286,794 | 6/42 | Dickey et al. | 252—8.8 |
| 2,353,166 | 7/44 | Lanz et al. | 252—8.5 |
| 2,497,062 | 2/50 | Artz | 260—461 |
| 2,791,495 | 5/57 | Rudell et al. | 44—72 |
| 2,863,747 | 12/58 | Cantrell et al. | 44—72 |
| 2,871,190 | 1/59 | Finlayson et al. | 260—461 |

DANIEL E. WYMAN, *Primary Examiner.*

JULIUS GREENWALD, *Examiner.*